US012683201B2

(12) United States Patent
Lee et al.

(10) Patent No.: US 12,683,201 B2
(45) Date of Patent: Jul. 14, 2026

(54) BATTERY CELL EXTERIOR INSPECTION SYSTEM

(71) Applicant: LG Energy Solution, Ltd., Seoul (KR)

(72) Inventors: Eun Gyu Lee, Daejeon (KR); Seung Gyun Hong, Daejeon (KR); Jong Myung Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 479 days.

(21) Appl. No.: 17/913,501

(22) PCT Filed: Jan. 5, 2022

(86) PCT No.: PCT/KR2022/000157
§ 371 (c)(1),
(2) Date: Sep. 22, 2022

(87) PCT Pub. No.: WO2022/154360
PCT Pub. Date: Jul. 21, 2022

(65) Prior Publication Data
US 2023/0140944 A1      May 11, 2023

(30) Foreign Application Priority Data

Jan. 12, 2021     (KR) ........................ 10-2021-0004213

(51) Int. Cl.
*H01M 10/42* (2006.01)
*G01N 21/88* (2006.01)
*G01N 21/952* (2006.01)

(52) U.S. Cl.
CPC .... *H01M 10/4285* (2013.01); *G01N 21/8851* (2013.01); *G01N 21/952* (2013.01);
(Continued)

(58) Field of Classification Search
CPC ....... G01N 2021/8887; G01N 21/8851; G01N 21/952; G01N 2201/0438; H01M 10/4207; H01M 10/4285; Y02E 60/10; Y02P 70/50
See application file for complete search history.

(56) References Cited

U.S. PATENT DOCUMENTS 6,169,600 B1 *   1/2001   Ludlow ................ G01N 21/952
                                                                131/905
7,353,954 B1 *   4/2008   Malek .................... G02B 13/22
                                                                209/922
(Continued)

FOREIGN PATENT DOCUMENTS

CN        104364960 A     2/2015
CN        108899589 A     11/2018
(Continued)

OTHER PUBLICATIONS

Luo et al, Automated Visual Defect Classification for Flat Steel Surface A Survey, IEEE, 2020 (Year: 2020).*
(Continued)

*Primary Examiner* — Kyle R Quigley
(74) *Attorney, Agent, or Firm* — Lerner David LLP

(57) ABSTRACT

A system for inspecting an exterior of a battery cell includes a tray on which battery cells are mounted in a plurality of rows, a first photographing part configured to horizontally move along the tray and photograph an upper surface of the battery cell while on the tray, at least one shuttle on which the battery cell is mounted, a transfer part configured to transfer the battery cells from the tray to the shuttle, a second photographing part configured to photograph a side surface and a lower surface of the battery cell while in the shuttle, and an inspection part configured to inspect a photographed image and determine whether the battery cell is defective. The second photographing part simultaneously photographs (Continued)

the side surface and the lower surface of the battery cell to simultaneously display the side and lower surfaces of the battery cell in one image.

19 Claims, 14 Drawing Sheets

(52) U.S. Cl.
    CPC ...... *H01M 10/4207* (2013.01); *G01N 2021/8887* (2013.01); *G01N 2201/0438* (2013.01)

(56) References Cited

U.S. PATENT DOCUMENTS

| | | | | |
|---|---|---|---|---|
| 8,056,700 | B2 * | 11/2011 | Malek | G01N 21/8901 |
| | | | | 209/922 |
| 2002/0166802 | A1 * | 11/2002 | Jung | H01M 10/052 |
| | | | | 324/426 |
| 2009/0078620 | A1 * | 3/2009 | Malek | G01N 21/95684 |
| | | | | 209/701 |
| 2012/0205296 | A1 * | 8/2012 | Malek | G01N 21/8901 |
| | | | | 209/552 |
| 2012/0224029 | A1 | 9/2012 | Pavani et al. | |
| 2015/0140379 | A1 | 5/2015 | Yau | |
| 2016/0188936 | A1 * | 6/2016 | Nunnink | H04N 23/00 |
| | | | | 235/462.22 |
| 2017/0148153 | A1 | 5/2017 | Nakao | |
| 2018/0165820 | A1 * | 6/2018 | Rhodes, Jr | G01N 21/01 |
| 2018/0321163 | A1 * | 11/2018 | Casadio | G01N 21/909 |
| 2019/0206045 | A1 * | 7/2019 | Wang | G06T 7/001 |
| 2020/0363344 | A1 * | 11/2020 | Heo | G01N 23/18 |
| 2021/0184280 | A1 * | 6/2021 | Kim | G01N 21/9515 |
| 2021/0209739 | A1 | 7/2021 | Wen et al. | |
| 2021/0250520 | A1 * | 8/2021 | Edwards | H04N 23/695 |
| 2021/0257648 | A1 * | 8/2021 | Jeung | H01M 50/213 |
| 2022/0357287 | A1 * | 11/2022 | Lee | H01M 10/42 |

FOREIGN PATENT DOCUMENTS

| | | | | |
|---|---|---|---|---|
| CN | 109239075 | A | 1/2019 | |
| CN | 111983036 | A | 11/2020 | |
| JP | H1068614 | A | 3/1998 | |
| JP | 2006234725 | A | 9/2006 | |
| JP | 4374051 | B2 | 12/2009 | |
| JP | 2015524142 | A | 8/2015 | |
| JP | 2017161487 | A | 9/2017 | |
| KR | 19930016785 | A | 8/1993 | |
| KR | 20110018081 | A | 2/2011 | |
| KR | 20110103195 | A | 9/2011 | |
| KR | 20120134806 | A | 12/2012 | |
| KR | 20150107447 | A | 9/2015 | |
| KR | 102028360 | B1 | 10/2019 | |
| KR | 20200023672 | A | 3/2020 | |
| KR | 20200030818 | A | 3/2020 | |
| KR | 20200054726 | A | 5/2020 | |
| KR | 20200141856 | A | 12/2020 | |
| WO | WO-2020091240 | A1 * | 5/2020 | H01M 50/213 |

OTHER PUBLICATIONS

Sanchez et al., Crack detection in concrete elements from RGB pictures using modified line detection Kernels, IEEE, 2017 (Year: 2017).*

Zakeri et al., Image Based Techniques for Crack Detection, Classification and Quantification in Asphalt Pavement A Review, Springer, 2017 (Year: 2017).*

De Beers et al., Visual hulls from single uncalibrated snapshots using two planar mirrors, ResearchGate, 2004 (Year: 2004).*

International Search Report for Application No. PCT/KR2022/000157 mailed Apr. 25, 2022, pp. 1-2.

Extended European Search Report including Written Opinion for Application No. 22739558.9 dated Sep. 8, 2023, pp. 1-6.

L. S. Calderon and J. Baira¡n, "Crack detection in concrete elements from RGB pictures using modified line detection Kernels," 2017 Intelligent Systems Conference (IntelliSys), London, UK, Sep. 8, 2017, pp. 799-805.

* cited by examiner

PRIOR ART
【FIG. 1】
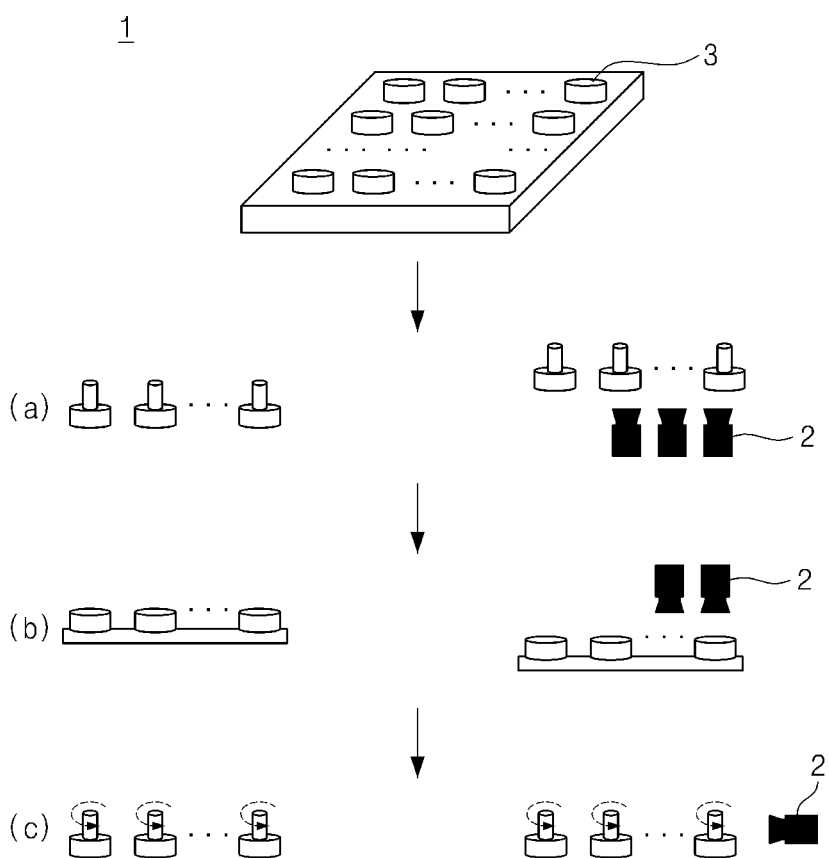

【FIG. 2】
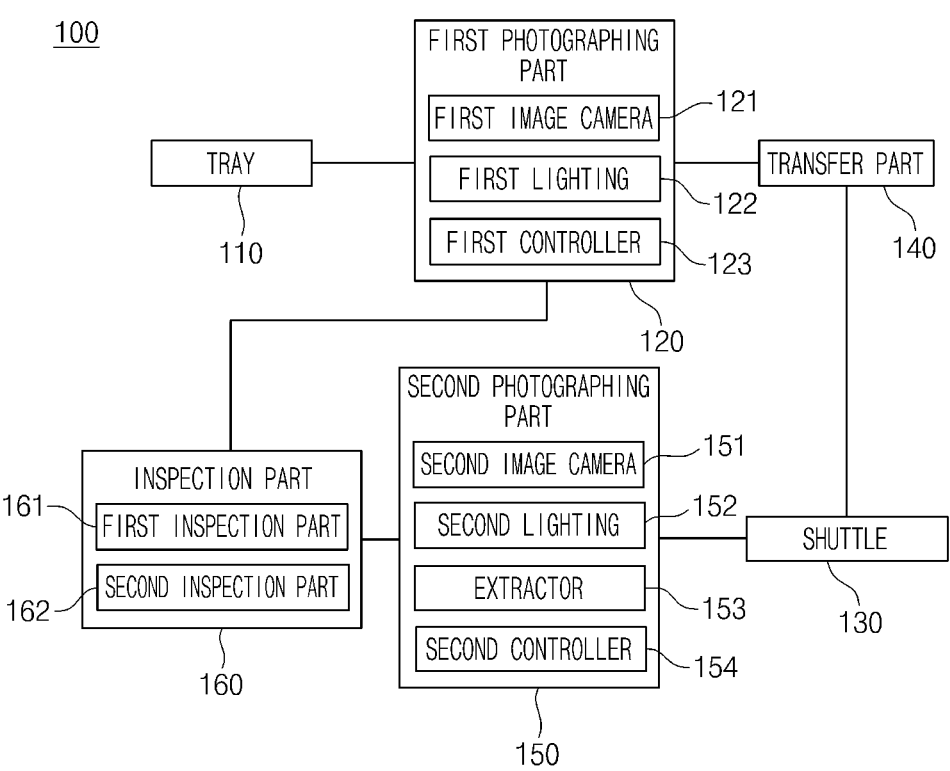

【FIG.3】
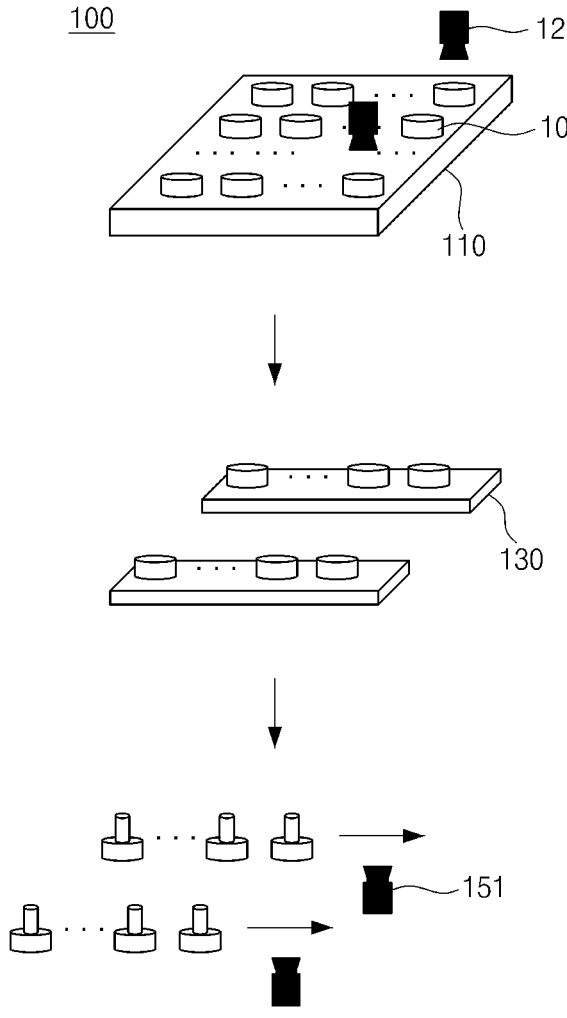

【FIG. 4】
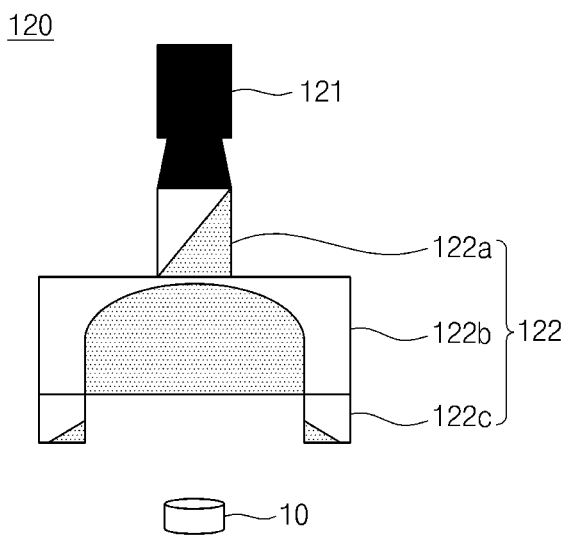

【FIG. 5】
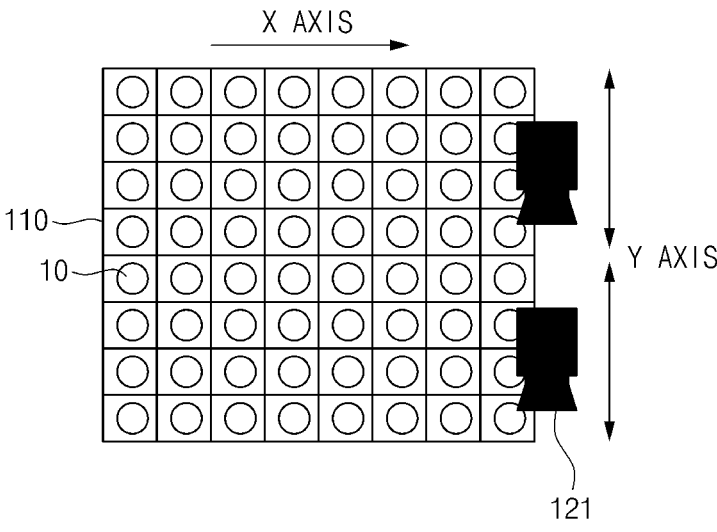

【FIG. 6】
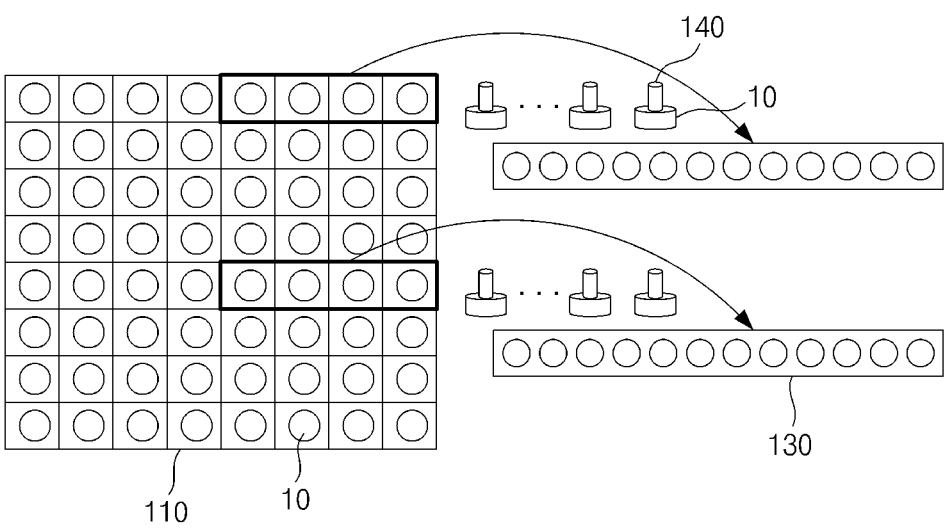

【FIG. 7】
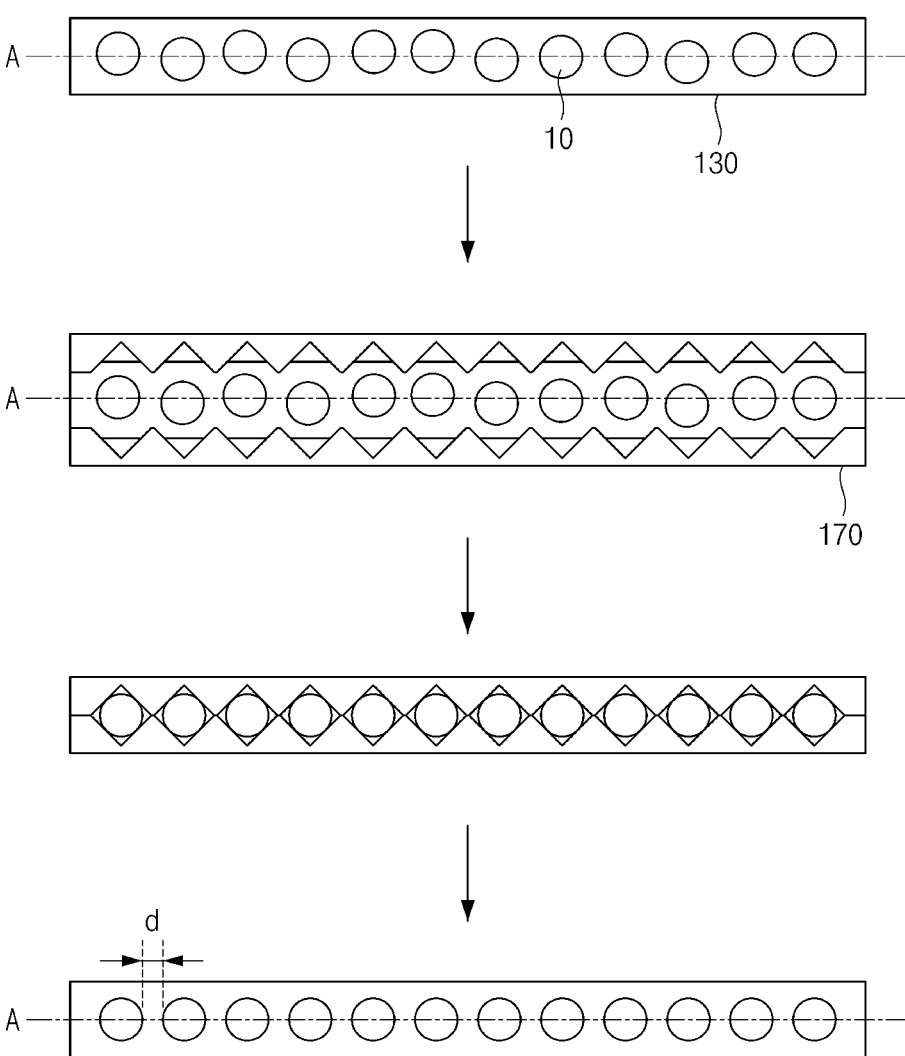

【FIG. 8】
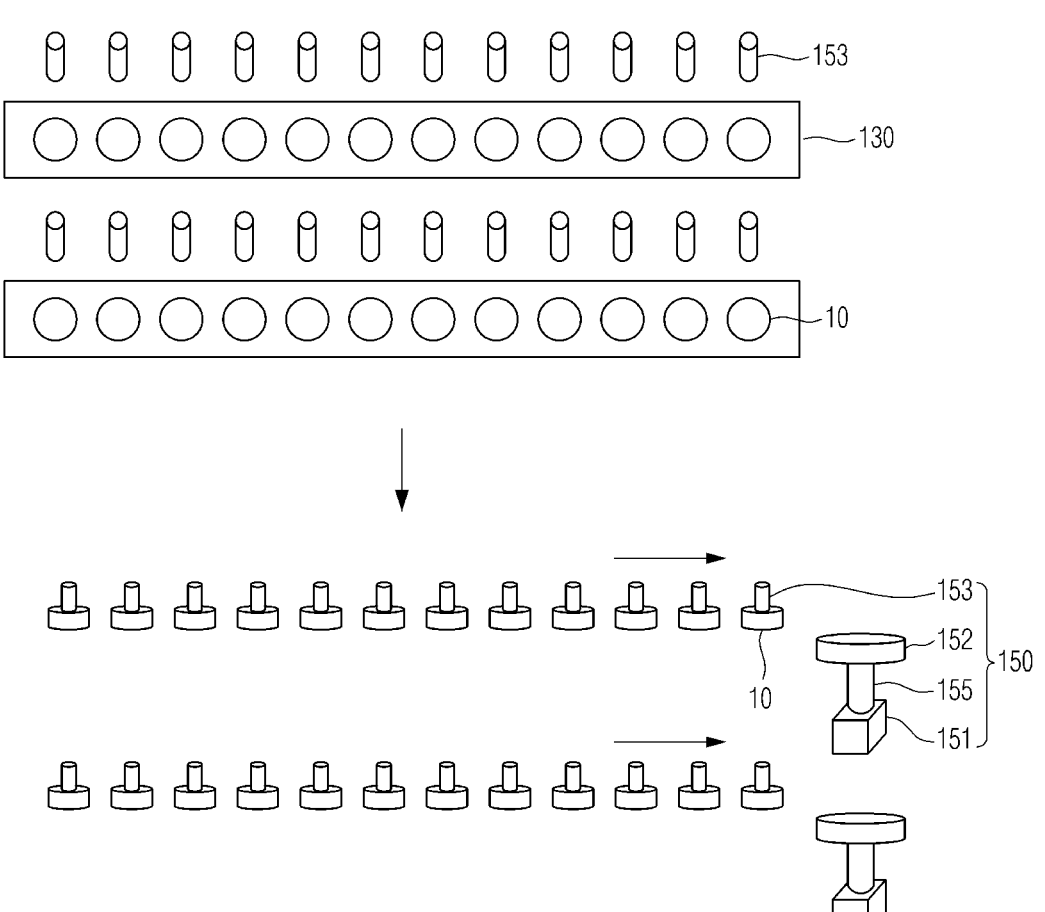

【FIG. 9】
155
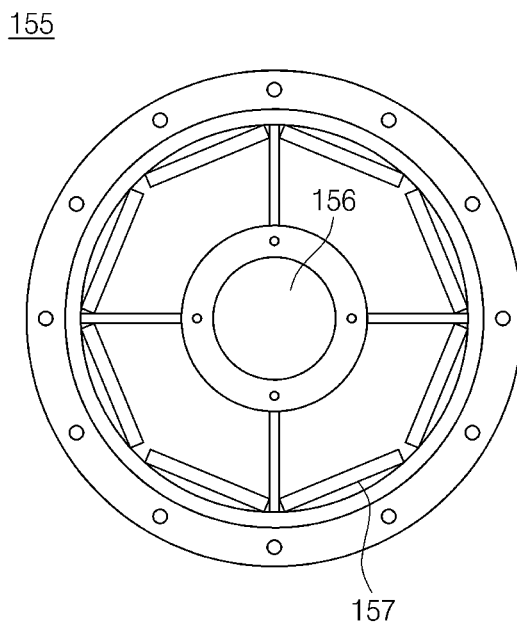

【FIG. 10】
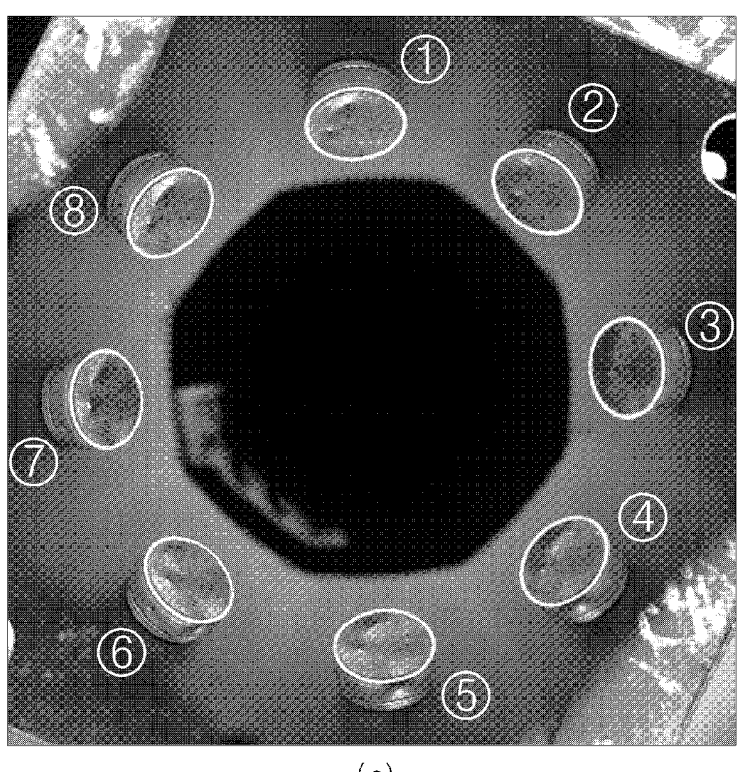
(a)
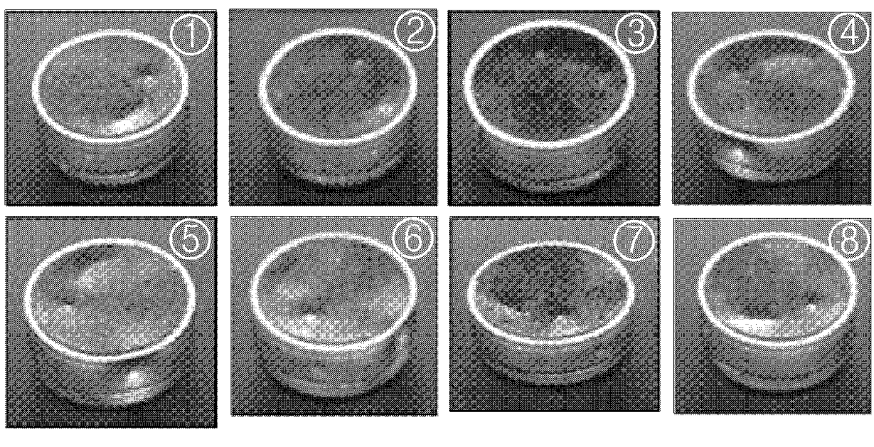
(b)

【FIG. 11】
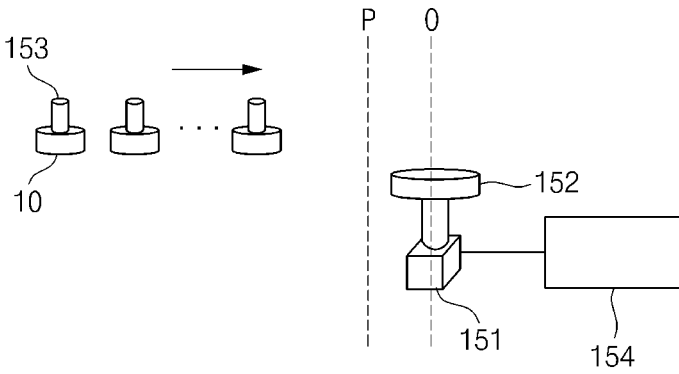

【FIG. 12】
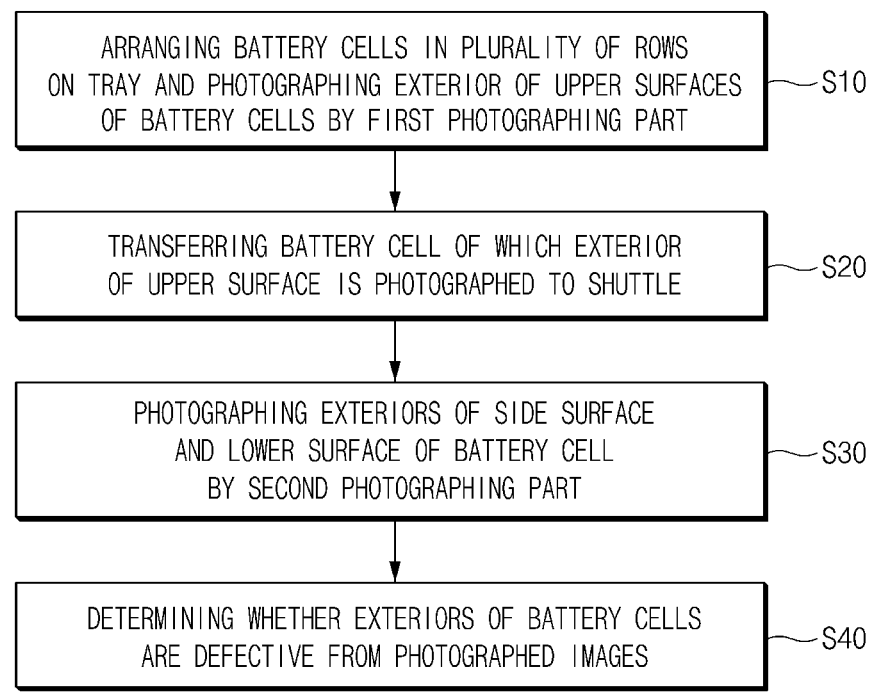

【FIG. 13】
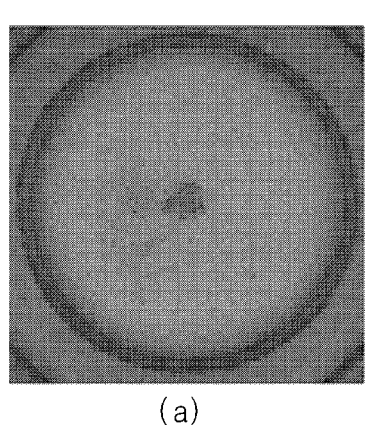
(a)
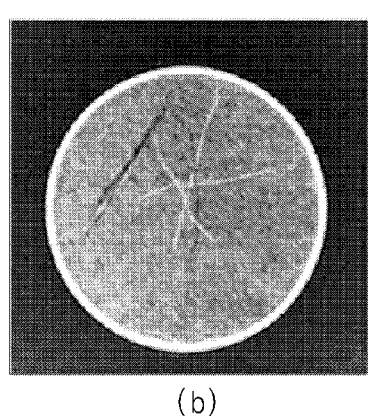
(b)
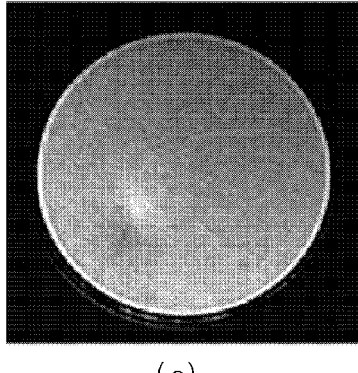
(c)

【FIG. 14】
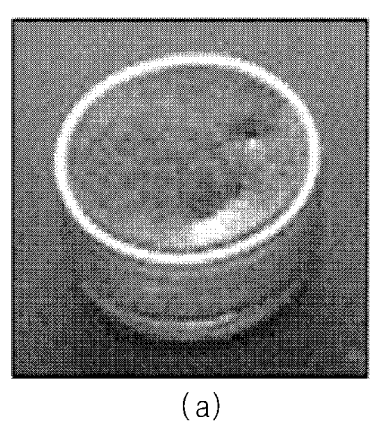
(a)
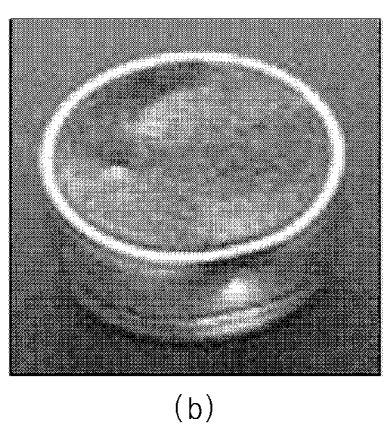
(b)
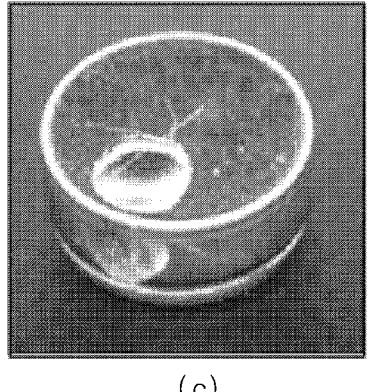
(c)
(d)

BATTERY CELL EXTERIOR INSPECTION SYSTEM

CROSS-REFERENCE TO RELATED APPLICATIONS

The present application is a national phase entry under 35 U.S.C. § 371 of International Application No. PCT/KR2022/000157 filed Jan. 5, 2022, which claims priority from Korean Patent Application No. 10-2021-0004213 filed Jan. 12, 2021, all of which are incorporated herein by reference.

TECHNICAL FIELD

The present invention relates to a system for inspecting an exterior of a battery cell, and more particularly, to a system for inspecting an exterior of a button-type battery cell or a cylindrical battery cell.

BACKGROUND ART

Recently, secondary batteries capable of being charged and discharged have been widely used as energy sources for wireless mobile devices. In addition, the secondary batteries are attracting attention as energy sources for electric vehicles and hybrid electric vehicles which are proposed as measures to solve air pollution of conventional gasoline and diesel vehicles using fossil fuels. Therefore, the types of applications using the secondary batteries are diversifying due to the advantages of the secondary batteries, and it is expected that the secondary batteries will be applied to more fields and products in the future than now.

The secondary batteries may be classified into lithium ion batteries, lithium ion polymer batteries, lithium polymer batteries, and the like according to an electrode and a composition of an electrolyte, and among these batteries, the use of the lithium ion polymer batteries, which are less likely to leak an electrolyte and are easily manufactured, is increasing. Generally, according to a shape of a battery case, the secondary batteries are classified into cylindrical batteries in which an electrode assembly is embedded in a cylindrical metal can, square-type batteries in which an electrode assembly is embedded in a square-type metal can, and pouch-type batteries in which an electrode assembly is embedded in a pouch-type case of an aluminum laminated sheet. The electrode assembly embedded in the battery case is formed with a structure of a positive electrode, a negative electrode, and a separator interposed between the positive electrode and the negative electrode and is a power generation element capable of being charged and discharged. The electrode assemblies are classified into jelly-roll type electrode assemblies in which a positive electrode and a negative electrode, which are long sheets coated with an active material, are wound with a separator interposed therebetween, and stack type electrode assemblies in which a plurality of positive and negative electrodes, each having a predetermined size, are sequentially stacked with a separator interposed therebetween.

Since such a battery cell is subjected to a phenomenon of contamination, scratches, or dents due to foreign materials in the battery case during a manufacturing process, an external inspection for selecting a battery cell having such exterior defects should be performed. Such external inspection is usually visually conducted, and such a manual inspection causes a deviation according to the condition of an inspector or the standards of inspectors, and consumes a lot of time and money. Thus, recently, in many cases, an external inspection is automatically performed by checking a portion where an exterior defect occurs in an image obtained by capturing an outer surface of a battery cell using a camera.

FIG. 1 is a schematic diagram illustrating a conventional system for inspecting an exterior of a battery cell.

Referring to FIG. 1, a conventional system 1 for inspecting an exterior of a battery cell captures an upper surface, a lower surface, and a side surface of a battery cell 3 using a camera 2, obtains images, and then individually inspects the images, thereby checking whether an exterior defect occurs. Specifically, as shown in FIG. 1, in the case of a button-type battery cell or a cylindrical battery cell, the battery cell is in a state of being disposed on a tray and is taken out of the tray, and a photographing of an exterior is performed. First, as shown in FIG. 1A, the lower surface of the battery cell is photographed in a state in which the battery cell is taken out, and as shown in FIG. 1B, the battery cell is placed on a separate shuttle and the upper surface of the battery cell is photographed. As shown in FIG. 1C, the side surface of the battery cell is photographed in a state in which the camera is fixed and the battery cell is rotated at an angle of 360°.

That is, when the above method is used, since a total of three sets of cameras are needed to photograph the battery cell, the number of cameras required for inspection is increased. In addition, in the case of the above method, since the battery cell needs to be rotated so as to photograph the side surface of the battery cell, separate equipment for rotating the battery cell is additionally required. Consequently, a volume of the equipment is increased, costs for constructing the device are increased, and efficiency of the inspection is reduced.

Therefore, there is a need to develop a technique capable of improving efficiency of an external inspection of the battery cell.

RELATED ART DOCUMENT

Patent Document

Korean Patent Laid-Open Application No. 10-2011-0018081

SUMMARY

Technical Problem

An object of the present invention is to provide a system for inspecting an exterior of a battery cell, which is capable of reducing a space occupied by equipment for an external inspection of a battery cell and equipment costs and improving inspection efficiency.

Technical Solution

A system for inspecting battery cell exteriors which includes a tray configured to hold a plurality of battery cells to be inspected in a plurality of rows, a first photographing part configured to horizontally move above the tray and photograph an exterior of an upper surface of the battery cells held in the tray, at least one shuttle configured to hold the battery cells, a transfer part configured to transfer the battery cells between the tray and the shuttle, a second photographing part configured to photograph exteriors of a side surface and a lower surface of the battery cells held in the shuttle, an inspection part configured to inspect images photographed by the photographing part and determine whether the exterior of at least one battery cell of the plurality of battery cells is defective, and wherein the second photographing part is configured to photograph the side surface and the lower surface of the battery cell in a single image.

The system may include a first lighting configured to emit light at different angles using a multi-channel method, and a first controller configured to control operations of the first image camera and the first lighting.

The first lighting may include coaxial lighting, dome lighting, and low-angle lighting.

The first controller may be configured to sequentially photograph the exteriors of the upper surfaces of the battery cells in an initial row of the tray while controlling the first image camera and the first lighting to move along the initial row of the tray, horizontally move the tray to position a next row of the tray below the first photographing part after the initial row of the tray is photographed, and sequentially photograph the exteriors of the upper surfaces of the battery cells in the next row of the tray while controlling the first image camera and the first lighting to move along the next row of the tray and repeat horizontally moving the tray and photographing the exteriors of the upper surfaces of the batteries of the next row of the tray until all rows of the tray are photographed.

The transfer part may be configured to extract battery cells held in the tray and arrange the extracted battery cells in a row on the shuttle.

The system for inspecting an exterior of a battery cell according to the present invention further includes an alignment jig configured to align central axes of the battery cells disposed in a row on the shuttle and intervals between the battery cells.

The alignment jig may be a pair of plate-shaped members positioned at opposing side surfaces of the battery cell, and a plurality of grooves positioned at regular intervals on one side of the alignment jig and in contact with the battery cell, and configured to accommodate the battery cells.

The system may include, one or more second lightings configured to emit light towards the battery cells, one or more extractors configured to extract the battery cells from the shuttle and transfer the battery cells to a photographing position, and a second controller configured to control operations of the second image camera, the one or more second lighting, and the one or more extractors.

The second image camera may include a polyview lens having a structure in which a plurality of reflectors are disposed to surround a periphery of the lens.

The second controller may be configured to transmit a trigger signal to the second image camera to operate the second image camera in response to the extracted battery cells passing a trigger transmit position.

The inspection part may be configured to detect at least one of a color, contrast, or chroma of at least one of the upper surface, the side surface or the lower surface of the at least one battery cell displayed on the images and determine whether a contamination event, a scratch, or a dent has occurred on the upper surface, the side surface or the lower surface of the at least one battery cell.

The inspection part may be configured to determine whether the exterior of the at least one battery cell of the plurality of battery cells is defective through deep learning.

The inspection part may be configured to include a first inspection part configured to inspect images photographed by the first photographing part, and a second inspection part configured to inspect images photographed by the second photographing part.

The first inspection part may be configured to analyze a two-dimensional code attached to at least one of the upper surfaces, the side surfaces or the lower surfaces of the battery cells.

The second inspection part may be configured to crop portions of the inspected images to derive cropped images, distinguish side surface portions from lower surface portions of the battery cells in the cropped images, and determine whether the exterior of at least one battery cell of the plurality of battery cells is defective based at least in part on an inspection of the distinguished side surface portion of the at least one battery cell and the distinguished lower surface portion of the at least one battery cell.

The plurality of battery cells may comprise button-type battery cells or cylindrical battery cells.

Advantageous Effects

In accordance with the present invention, an upper surface of a battery cell on a tray is inspected, and then a side surface and a lower surface of a battery cell are photographed at one time using one camera so that the number of cameras and equipment used for photographing the battery cell can be reduced. Consequently, it is possible to reduce costs for an external inspection of the battery cell and improve inspection efficiency.

BRIEF DESCRIPTION OF THE DRAWINGS

FIG. 1 is a schematic diagram illustrating a conventional system for inspecting an exterior of a battery cell.

FIG. 2 is a block diagram illustrating a configuration of a system for inspecting an exterior of a battery cell according to the present invention.

FIG. 3 is a schematic diagram illustrating a system for inspecting an exterior of a battery cell according to one embodiment of the present invention.

FIG. 4 is a schematic diagram illustrating a structure of a first photographing part.

FIG. 5 is a schematic diagram illustrating an operation of the first photographing part in the system for inspecting an exterior of a battery cell according to the present invention.

FIG. 6 is a schematic diagram illustrating an operation of a transfer part in the system for inspecting an exterior of a battery cell according to the present invention.

FIG. 7 is a schematic diagram illustrating an operation of an alignment jig in a system for inspecting an exterior of a battery cell according to another embodiment of the present invention.

FIG. 8 is a schematic diagram illustrating an operation of a second photographing part in the system for inspecting an exterior of a battery cell according to the present invention.

FIG. 9 is a schematic diagram illustrating a structure of a polyview lens in the second photographing part.

FIG. 10 shows photographs illustrating images photographed by the polyview lens.

FIG. 11 is a schematic diagram illustrating a process in which a second image camera photographs the battery cell.

FIG. 12 is a flowchart illustrating a sequence of a method of inspecting an exterior of a battery cell according to the present invention.

FIGS. 13 and 14 show photographs illustrating exteriors of battery cells which are determined to be defective in an embodiment of the present invention.

DETAILED DESCRIPTION

Hereinafter, the present invention will be described in detail. Before describing the present invention, terms or words used herein and the appended claims should not be construed as being limited to ordinary or dictionary meanings, and these should be construed in accordance with the meaning and concept consistent with the technical spirit of the present invention according to the principle in that inventors can properly define concepts of terms in order to describe their inventions in the best way.

In the present application, the terms "comprising," "having," or the like are used to specify the presence of a feature, a number, a step, an operation, a component, an element, or a combination thereof described herein, and the terms do not preclude the presence or addition of one or more other features, numbers, steps, operations, components, elements, or combinations thereof. In addition, when a portion of a layer, a film, a region, a plate, or the like is referred to as being "on" another portion, this includes not only a case in which the portion is "directly on" another portion but also a case in which still another portion is present between the portion and another portion. Conversely, when a portion of a layer, a film, a region, a plate, or the like is referred to as being "under" another portion, this includes not only a case in which the portion is "directly under" another portion but also a case in which another portion is present between the portion and another portion. In addition, in the present application, as being disposed "on" may include the case of being disposed not only on an upper portion but also on a lower portion.

Meanwhile, in the present application, an "upper surface" and a "lower surface" indicate relative positions of surfaces constituting a battery cell, and the "upper surface" refers to a surface exposed upward when the battery cell is mounted on a tray, and the "lower surface" refers to an opposite surface of the "upper surface." A "side surface" refers to a vertical surface located between the upper surface and the lower surface.

Hereinafter, the present invention will be described in detail.

FIG. 2 is a block diagram illustrating a configuration of a system for inspecting an exterior of a battery cell according to the present invention.

Referring to FIG. 2, a system 100 for inspecting an exterior of a battery cell according to the present invention includes a tray 110 on which battery cells to be inspected are mounted in a state of being disposed in a plurality of rows, a first photographing part 120 configured to horizontally move above the tray 110 and photograph an exterior of an upper surface of the battery cell mounted on the tray 110, at least one shuttle 130 on which a battery cell of which an exterior of an upper surface is photographed is mounted, a transfer part 140 configured to transfer the battery cell between the tray 110 and the shuttle 130, a second photographing part 150 configured to photograph exteriors of a side surface and a lower surface of the battery cell transferred to the shuttle 130, and an inspection part 160 configured to inspect the photographed images and determine whether the exteriors of the battery cell are defective. The second photographing part 150 simultaneously photographs the side surface and the lower surface of the battery cell so as to simultaneously display exteriors of the side surface and the lower surface of the battery cell in one image.

As described above, in the related art, since a total of three sets of cameras are needed to photograph the battery cell, the number of cameras required for inspection is increased. In addition, in the case of the above method, since the battery cell needs to be rotated so as to photograph the side surface of the battery cell, separate equipment for rotating the battery cell is additionally required. Consequently, a volume of the equipment is increased, costs for constructing the device is increased, and efficiency of the inspection is reduced.

In accordance with the present invention, an upper surface of a battery cell on a tray is inspected, and then a side surface and a lower surface of a battery cell are photographed at one time using one camera so that the number of cameras and equipment used for photographing the battery cell can be reduced. Consequently, it is possible to reduce costs for an external inspection of the battery cell and improve inspection efficiency.

FIG. 3 is a schematic diagram illustrating a system for inspecting an exterior of a battery cell according to one embodiment of the present invention.

Referring to FIG. 3 together with FIG. 2, in the system 100 for inspecting an exterior of a battery cell according to the present invention, an exterior of an upper surface of a battery cell 10 may be photographed first, and then exteriors of a side surface and a lower surface may be photographed. However, the scope of the present invention is not limited thereto, and the exteriors of the side surface and the lower surface of the battery cell may be photographed first, as necessary.

Meanwhile, in the present invention, a type of the battery cell 10 is not particularly limited, and the battery cell 10 may be, for example, a cylindrical battery cell or a button-type battery cell. The cylindrical battery cell has a structure in which an electrode assembly is accommodated in a cylindrical can-shaped battery case, and a cap assembly is coupled to an open top of the cylindrical can. The button-type battery cell refers to a battery cell exhibiting a button shape or a coin shape because a height of the cylindrical can is low. Descriptions of shapes of other battery cells, and a negative electrode, a positive electrode, a separator, and an electrolyte, which constitute the battery cell, are known to those skilled in the art, and thus detailed description thereof will be omitted herein.

The battery cell 10 is mounted on the tray 110, and an upper surface of the battery cell 10 is inspected. The tray 110 is formed such that battery cells 10 to be inspected may be mounted in a state of being disposed in a plurality of rows. The system 100 for inspecting an exterior of a battery cell according to the present invention has an advantage of being able to photograph the battery cell in a state in which the battery cell is mounted on the tray without mounting the battery cell in a separate device. The tray 110 has a flat plate shape, and in some cases, a partition wall which divides a space in which each individual battery cell may be mounted or an insertion groove recessed according to a shape of the battery cell to mount the battery cell may be formed. In addition, there is no specific limitation on a size of the tray 110 and the number of battery cells capable of being mounted.

As described above, when the battery cell is mounted on the tray 110, the upper surface of the battery cell is exposed, and the first photographing part 120 photographs the exposed upper surface. As described below, the first photographing part 120 includes a first image camera 121 and is horizontally moved above the tray 110 to photograph an exterior of the upper surface of the battery cell mounted on the tray 110.

As described below, the battery cell 10, of which the exterior of the upper surface is photographed, is transferred to the shuttle 130 and then taken out, and the side surface and the lower surface of the battery cell 10 are simultaneously photographed by the second photographing part 150 including a second image camera 151.

FIG. 4 is a schematic diagram illustrating a structure of a first photographing part.

Referring to FIG. 4 together with FIG. 2, the first photographing part 120 includes at least one first image camera 121, at least one first lighting 122 using a multi-channel method for emitting light at different angles, and a first controller 123 configured to control operations of the first image camera 121 and the first lighting 122. That is, in the first photographing part, the first controller 123 controls the first image camera 121 and the first lighting 122 to horizontally move above the tray 110. In addition, the first controller 123 may control the operation of the tray 110.

The first image camera 121 is for photographing the exterior of the upper surface of the battery cell, and there is no particular limitation on a type of the first image camera 121 as long as an image can be obtained by photographing. For example, the first image camera may be a charge-coupled device (CCD) camera or the like. One or more first image cameras 121 may be provided, and when an inspection speed is to be faster, the number of first image cameras 121 may be further increased. For example, two first image cameras may be used as shown in FIG. 3.

Meanwhile, the first lighting 122 is located in the vicinity of the first image camera 121 and emits light to a portion to be photographed. The first lighting 122 may emit light at different angles and employ a multi-channel method. Alternatively, the first lighting 122 may be set to have different wavelengths of light to be adjusted for each channel. As described above, by emitting light at different angles and controlling a wavelength of the emitted light, it is possible to detect all various exterior defects which may occur on the surface of the battery cell. This is because the types of exterior defects appearing according to the angle and wavelength of light are different. For example, the first lighting 122 may include a coaxial lighting 122a, a dome lighting 122b, and a low-angle lighting 122c. In addition, the first lighting 122 may be installed at each first image camera 121.

FIG. 5 is a schematic diagram illustrating an operation of the first photographing part in the system for inspecting an exterior of a battery cell according to the present invention.

As described above, the operation of the first photographing part 120 may be controlled by the first controller 123. Referring to FIG. 2 together with FIG. 5, the first controller 123 moves the first image camera 121 and the first lighting 122 along battery cells 10 disposed in an nth row of the tray 110 (n is an integer of 1 or more) to sequentially photograph upper surfaces of the battery cells 10, and when the photographing of the battery cells 10 disposed in the $n^{th}$ row is completed, the first controller 123 horizontally moves the tray 110 to locate battery cells 10 disposed in an $(n+1)^{th}$ row below the first image camera 121 and the first lighting 122, and the first controller 123 moves the first image camera 121 and first lighting 122 along the battery cells 10 disposed in the $(n+1)^{th}$ row to sequentially photograph exteriors of the upper surfaces of the battery cells 10. Here, an upper limit value of n is the number of rows of battery cells disposed on the tray.

That is, as shown in FIG. 5, the first image camera 121 (including the first lighting) is horizontally moved in any one direction (for example, a y-axis direction) in which the battery cells 10 are disposed on the tray 110 to photograph the upper surfaces of the battery cells 10, and when the photographing of the battery cells 10 disposed and mounted in one row is completed, the tray 110 is moved one space in a direction (an x-axis direction) perpendicular to the direc-tion in which the first image camera 121 moves to allow the first image camera 121 to photograph battery cells in an adjacent row.

For example, referring to FIG. 5, two first image cameras 121 may be provided. In this case, the tray 110 is bisected in the y-axis direction, and each area may be photographed using one first image camera 121. In this case, each first image camera 121 is moved one space in the y-axis direction to photograph the exterior of the upper surface of the battery cell 10. Specifically, the first image camera 121 is located in an intermediate portion of the tray 110 (in fourth and fifth rows) in the y-axis direction, and then when the photographing starts, the first image camera 121 is moved to an end of the tray 110 in the y-axis direction to sequentially photograph the battery cells 10. When the photographing of the battery cells disposed in one row is completed, the tray 110 is moved one space in the x-axis direction to repeat the same process until the photographing of all battery cells is completed.

When the photographing of the exterior of the upper surface of the battery cell is completed, the photographing of a side surface and a lower surface is performed. As described above, in the present invention, the photographing of the side surface and the exterior of the battery cell is simultaneously performed using one camera. Here, the simultaneous photographing refers to simultaneously photographing the side surface and the lower surface of the battery cell to allow the side surface and the lower surface to be displayed in one image without respectively photographing the side surface and the lower surface to obtain separate images.

FIG. 6 is a schematic diagram illustrating an operation of a transfer part in the system for inspecting an exterior of a battery cell according to the present invention.

Referring to FIG. 6, when the photographing of the exterior of the upper surface of the battery cell 10 is completed, the battery cell 10 mounted on the tray 110 is transferred to the shuttle 130. The transfer is performed by the transfer part 140. This is because the transfer of the battery cell 10 to the shuttle 130 is to arrange the battery cells in a predetermined shape. A method of transferring the battery cell 10 by the transfer part 140 may be appropriately selected by those skilled in the art and, for example, as shown in FIG. 6, the transfer part 140 may be a picker capable of adsorbing the battery cell 10. In this way, when the battery cell 10 is transferred by an adsorption method, it is possible to prevent an impact from being applied to the battery case and prevent a surface of the battery case from being damaged due to the transfer part. The transfer part 140 is attached to the upper surface of each battery cell 10 to transfer the battery cell 10 onto the shuttle 130 and arrange the battery cells 10 in a row on the shuttle 130.

The battery cell of which the exterior of the upper surface is photographed is mounted on the shuttle 130, and the shuttle 130 arranges the battery cell 10 in a specific form for photographing of the side surface and the lower surface, which will be described below. Specifically, the battery cells 10 are disposed in a row on the shuttle 130. As described above, the battery cells 10 are arranged in a row, and thus the battery cells 10 are taken out by an extractor, which will be described below, and then are sequentially transferred to a photographing point so that the exteriors of the side surface and the lower surface may be photographed. The number of shuttles 130 may be appropriately adjusted according to a speed of an inspection process, for example, the number of second image cameras which will be described below. For example, when two second image cameras are used, the battery cells may be disposed on two shuttles 130 in a row.

When the battery cell 10 is mounted on the shuttle 130, the exteriors of the side surface and the lower surface of the battery cell 10 are photographed by the second photographing part 150.

FIG. 8 is a schematic diagram illustrating an operation of a second photographing part in the system for inspecting an exterior of a battery cell according to the present invention. FIG. 9 is a schematic diagram illustrating a structure of a polyview lens in the second photographing part, and FIG. 10 shows photographs illustrating images photographed by the polyview lens.

Referring to FIG. 8 together with FIG. 2, the second photographing part 150 includes at least one second image camera 151, one or more second lightings 152 configured to emit light to the battery cell, one or more extractors 153 configured to extract the battery cell from the shuttle 130 and transfer the battery cell to a photographing position, and a second controller 154 configured to control operations of the second image camera 151, the second lighting 152, and the extractor 153.

The second image camera 151 is located below the battery cell 10. The battery cell 10 is transferred above (the photographing position of) the second image camera 151, and when the battery cell 10 is located at the photographing position, the second image camera 151 recognizes the battery cell and photographs the battery cell 10. The second image camera 151 may use the same type as the first image camera.

Meanwhile, in the present invention, the second image camera 151 should simultaneously photograph the side surface and the lower surface of the battery cell so as to simultaneously display exteriors of the side surface and the lower surface of the battery cell in one image. To this end, the second image camera 151 includes a polyview lens 155.

Referring to FIG. 9, the polyview lens 155 has a structure in which a plurality of reflectors 157 are disposed around a lens 156 to surround the lens 156. FIG. 9 illustrates a polyview lens in which eight reflectors 157 surround the lens 156. As shown in FIG. 9, since the reflectors 157 are located around the lens 156, when the battery cell is photographed, the polyview lens 155 may obtain an image as shown in FIG. 10A where the battery cell is viewed from positions where the reflectors 157 are located. In FIG. 9, since the eight reflectors 157 are located, eight images of the side surfaces photographed at different angles may be obtained. In this way, when the polyview lens is used, it is possible to achieve the same effect as photographing the lower surface of the battery cell and photographing the battery cell while rotating the battery cell at an angle of 360°. That is, the present invention has an advantage in that, when the side surface and the lower surface of the battery cell are photographed, the polyview lens is used so that it is possible to omit a process of separately photographing the side surface and the lower surface of the battery cell.

In addition, like the first image camera, the second image camera 151 may include the second lighting 152 for emitting light to the battery cell being photographed. As described above, in the present invention, since the photographing of the side surface and the lower surface of the battery cell is performed using the polyview lens, there is no need to use a multi-channel optical system like the first lighting, and a conventional lighting capable of being used for visual inspection may be used.

FIG. 11 is a schematic diagram illustrating a process in which a second image camera photographs the battery cell.

Referring to FIG. 11 together with FIGS. 8 and 2, the extractor 153 extracts the battery cell 10 from the shuttle 130 and transfers the battery cell 10 to the photographing position, and the second controller 154 controls the operations of the second image camera 151, the second lighting 152, and the extractor 153. The extractors 153 may be provided in the same number as the number of battery cells 10 disposed on the shuttle 130, may be controlled by the second controller 154, and may simultaneously extract the battery cells 10 on the shuttle 130 in a state of being disposed in a row in the same direction in which the battery cells 10 are disposed on the shuttle 130. In this case, the extractors 153 match the battery cells 10 in a one-to-one manner to take out the battery cells 10. The extractor 153 may employ the same transfer part as described above and take out the battery cell by an adsorption method.

When the extractors 153 take out the battery cells 10, the extractors 153 transfer the battery cells 10 to the photographing position O in a state in which the battery cells 10 are disposed in a row. As described above, since the second image camera 151 is located below the lower surface of the battery cell 10, the photographing position is above the second image camera 151 and the second lighting 152. When the extractor 153 arrives at the photographing position, the second image camera 151 recognizes the arrival of the extractor 153 and photographs the battery cell 10. Referring to FIG. 11, when the extracted battery cell passes a trigger transfer position P, the second controller 154 transmits a trigger signal to the second image camera 151 to allow the second image camera 151 to operate. When the trigger signal is received, the second image camera 151 operates to photograph the battery cell 10.

Meanwhile, the polyview lens 155 used in the second image camera 151 has an advantage, due to its characteristics, of being able to achieve the same effect as photographing the battery cell while rotating the battery cell at an angle of 360°. However, since an area where an image is able to be photographed is narrow, when the battery cells are out of alignment, a portion to be photographed may not be photographed. Therefore, before the extractors 153 take out the battery cells 10, it is necessary to uniformly align the battery cells 10 on the shuttle 130.

FIG. 7 is a schematic diagram illustrating an operation of an alignment jig in a system for inspecting an exterior of a battery cell according to another embodiment of the present invention.

In another example, the system for inspecting an exterior of a battery cell according to the present invention further includes an alignment jig 170 configured to align central axes A of the battery cells 10 disposed in a row on the shuttle 130 and intervals d between the battery cells 10.

Referring to FIG. 7, the alignment jig 170 is a plate-shaped member extending in a direction in which the shuttle 130 extends and is located on each of two side surfaces of the battery cell 10. In each alignment jig 170, grooves in which the battery cells 10 may be accommodated are formed at regular intervals on one side in contact with the battery cells 10.

When the battery cells 10 are mounted on shuttle 130, the alignment jigs 170 are moved in a direction of battery cells 10. Accordingly, in the alignment jigs 170, the battery cell 10 is accommodated in a space formed by bringing protruding portions between the grooves and the grooves facing each other into contact with each other. In this case, the space formed by bringing the grooves facing each other into contact with each other in the alignment jig 170 at both sides of the battery cell 10 has a volume enough to fit one battery cell 10, and thus the central axes A of the battery cells 10 and the intervals d therebetween may be precisely aligned.

When the photographing of the battery cell is completed using the above method, the inspection part 160 inspects the photographed image and determines whether an exterior of the battery cell is defective.

Referring to FIG. 2, the inspection part 160 detects one or more among a color, contrast, and chroma of the surface of the battery cell displayed on the image and inspects whether a phenomenon of contamination, scratches, or dents occurs on the surface of the battery cell. Specifically, the inspection part 160 converts the photographed image into visual data, and to this end, the inspection part 160 may include a predetermined program memory (not shown) for data conversion and an arithmetic operation, an arithmetic operator (not shown) configured to convert an actual photographed image into visual data on the basis of the program and represent an exterior shape from the visual data as a numerical value, and a display (not shown) configured to display the visual data and the numerical value on a screen.

In addition, the inspection part 160 determines whether the exterior is defective on the basis of the visual data and the numerical value. Specifically, the inspection part 160 may include a storage (not shown) in which a database related to a preset criterion is stored, a comparison operator (not shown) configured to compare and calculate a criterion extracted from the database with measured data, and a determination part (not shown) configured to determine whether an exterior is defective on the basis of the comparison and calculation result. When an abnormality is detected by comparing the preset criterion with the measured data, the inspection part 160 may determine that the exterior is defective.

In this case, the inspection part 160 may automatically determine whether the exterior is defective through deep learning. That is, through machine learning using deep learning, the inspection part 160 automatically updates the database and a corresponding determination criterion whenever the result measurement is completed and determines whether an exterior is defective on the basis of the updated database and the updated determination criterion. A specific content related to the deep learning is known to those skilled in the art, and thus a detailed description thereof will be omitted herein.

Meanwhile, in the present invention, the image used for the defect determination is provided as two types which are an image photographed by the first photographing part and an image captured by the second photographing part. Thus, the inspection part 160 includes a first inspection part 161 configured to inspect an image photographed by the first photographing part, and a second inspection part 162 configured to inspect an image photographed by the second photographing part. However, the above classification is abstractly classified according to an image inspection method, and two types of images may be inspected using separate devices or software, or both of the two types of images may be inspected using one device or software.

Using the above methods, the first inspection part 161 inspects an exterior image of the upper surface of the battery cell photographed by the first photographing part. In this case, the first inspection part 161 simultaneously analyzes a two-dimensional code attached to the surface of the battery cell. The two-dimensional code may be a barcode or a quick response (QR) code containing information on a battery cell which is an inspection target. As the analysis of the two-dimensional code is performed at the same time as the external inspection, an efficiency of a process may be further improved.

Meanwhile, the second inspection part 162 inspects images of the side surface and the lower surface of the battery cell photographed by the second photographing part. The image is formed as a set of a plurality of images photographed by the polyview lens at different angles. In order to analyze the image, the second inspection part 162 crops only a portion where the battery cell is photographed from among the previously photographed image and cuts out an unnecessary portion. Then, each image is rotated appropriately to adjust an angle such that each image has a similar shape. For example, as shown in FIG. 10B, the images photographed in FIG. 10A may be rotated such that the lower surface of the battery cell faces upward. Thereafter, the second inspection part 162 distinguishes a side surface portion and a lower surface portion of the battery cell in the cropped image, inspects the distinguished side surface portion and the distinguished lower surface portion, and determines whether the exterior is defective.

Meanwhile, the present invention provides a method of inspecting an exterior of a battery cell.

FIG. 12 is a flowchart illustrating a sequence of the method of inspecting an exterior of a battery cell according to the present invention.

Referring to FIG. 12, the method of inspecting an exterior of a battery cell according to the present invention includes arranging battery cells in a plurality of rows on a tray and photographing exteriors of upper surfaces of the battery cells by a first photographing part (S10), transferring the battery cell of which the exterior of the upper surface is photographed to a shuttle (S20), photographing exteriors of a side surface and a lower surface of the battery cell by a second photographing part (S30), and determining whether the exterior of the battery cell is defective from the photographed image (S40). In this case, the second photographing part may simultaneously photograph the side surface and the lower surface of the battery cell so as to simultaneously display the exteriors of the side surface and the lower surface of the battery cell in one image. The above description may be performed by the above-described system for inspecting an exterior of a battery cell.

First, battery cells to be inspected are prepared. As described above, the battery cell may be a cylindrical battery cell or a button-type battery cell.

When the battery cells are prepared, the battery cells are disposed in a plurality of rows on the tray and the exteriors of the upper surfaces of the battery cells are photographed by the first photographing part. Specifically, the photographing of the exteriors of the upper surfaces of the battery cells includes sequentially photographing an exterior of an upper surface of a battery cell located in an $n^{th}$ row (n is an integer of 1 or more) while moving a first image camera and a first lighting located above the tray in one direction, when the photographing of the exterior of the upper surface of the battery cell located in the e row is completed, horizontally moving the tray to locate a battery cell disposed in an $(n+1)^{th}$ row below the first photographing part, and sequentially photographing the exterior of the upper surface of the battery cell located in the $(n+1)^{th}$ row (n is an integer of 1 or more) while moving the first image camera and the first lighting in one direction.

When the photographing of the exterior of the upper surface of the battery cell is completed, the battery cell is transferred to the shuttle. The transferring of the battery cell to the shuttle includes taking out the battery cells mounted on the tray and arranging the battery cells in a row on the shuttle. In this case, the transferring of the battery cell to the shuttle may further include aligning central axes of the battery cells disposed in a row and intervals between the battery cells.

When the battery cells are disposed on the shuttle, the exteriors of the side surface and the lower surface of the battery cell are photographed.

The photographing of the exteriors of the side surface and the lower surface of the battery cell may include extracting the battery cells disposed in a row on the shuttle, transferring the extracted battery cell to a photographing position, and when the extracted battery cell passes a predetermined position, transmitting a trigger signal to a second photographing part, and photographing the exteriors of the side surface and the lower surface of the battery cell according to the trigger signal. In this case, a second image camera included in the second photographing part may include a polyview lens.

When the photographing of the battery cell is completed, it is determined whether the exterior is defective from the photographed image. Specifically, it is determined whether the surface of the battery cell is contaminated, scratched, or dented from an image obtained by photographing the exterior of the upper surface of the battery cell and an image obtained by photographing the exteriors of the side surface and the lower surface of the battery cell. In addition, the determining of whether the exterior is defective may be automatically performed through deep learning.

Meanwhile, the determining of whether the exterior is defective may include determining the image obtained by photographing the exterior of the upper surface of the battery cell and determining the image obtained by photographing the exteriors of the lower surfaces and the side surface of the battery cell.

In this case, in the determining of the image obtained by photographing the exterior of the upper surface of the battery cell, analysis of a two-dimensional code attached to the surface of the battery cell may be simultaneously performed.

Meanwhile, the determining of the image obtained by photographing the exteriors of the lower surfaces and the side surface of the battery cell may include cropping a portion in which the battery cell is photographed from among the photographed image, distinguishing a side portion and a lower portion of the battery cell in the cropped image, inspecting the distinguished side portion and the distinguished lower portion, and determining whether the exterior is defective.

[Modes of the Invention]

Hereinafter, in order to aid understanding of the present invention, examples will be described in detail. The examples of the present invention may be modified into various forms, and the scope of the present invention should not be construed as being limited to the examples described in detail below. These examples are provided to more fully describe the present invention to those skilled in the art.

Manufacturing Example

A positive electrode mixture was prepared by mixing 96.7 parts by weight of Li[Ni$_{0.6}$Mn$_{0.2}$Co$_{0.2}$]O$_2$ serving as a positive electrode active material, 1.3 parts by weight of graphite serving as a conductive material, and 2.0 parts by weight of polyvinylidene fluoride (PVdF) serving as a binder. A positive electrode slurry was prepared by dispersing the prepared positive electrode mixture in 1-methyl-2-pyrrolidone serving as a solvent. A positive electrode was manufactured by applying, drying, and pressing the positive electrode slurry on both sides of an aluminum foil having a thickness of 8 μm.

A negative electrode mixture was prepared by mixing 97.6 parts by weight of artificial graphite and natural graphite (a weight ratio: 90:10) serving as a negative electrode active material, 1.2 parts by weight of styrene-butadiene rubber (SBR) serving as a binder, and 1.2 parts by weight of carboxymethyl cellulose (CMC). A negative electrode slurry was prepared by dispersing the negative electrode mixture in ion-exchanged water serving as a solvent. A negative electrode was manufactured by applying, drying, and pressing the negative electrode slurry on both sides of a copper foil having a thickness of 8 μm.

LiPF$_6$ was dissolved in an organic solvent in which ethylene carbonate (EC), propylene carbonate (PC), and diethyl carbonate (DEC) were in a composition of 3:3:4 (volume ratio) to a concentration of 1.0M to prepare a non-aqueous electrolyte.

A porous polyethylene separator was stacked between the manufactured positive electrode and the manufactured negative electrode, the separator was accommodated in a button-shaped cylindrical can, an electrolyte was injected into the button-shaped cylindrical can, a cap assembly was coupling and sealed, and a plurality of button-type battery cells were manufactured.

Example 1

The button-type battery cells were disposed in an array of 24×24 on the tray, the exterior of the upper surface of the battery cell was photographed according to FIG. 4 by the first photographing part as shown in FIG. 3. An image in which an exterior defect occurred was selected from the photographed image. In this case, images of the battery cells determined as being defective are shown in FIG. 13. FIG. 13A shows an image in which a surface of the battery cell was contaminated, FIG. 13B shows an image in which scratches occur on the surface of the battery cell, and FIG. 13C shows an image in which a dent phenomenon occurred on the surface of the battery cell.

Example 2

Subsequently, the battery cell of which the exterior of the upper surface was photographed was mounted on the shuttle by a transfer part. In this case, 12 battery cells were disposed in a row. The battery cells were aligned using an alignment jig and photographed using the second photographing part according to FIGS. 8 and 11, and thus the images as shown in FIG. 10 were obtained. In this case, the battery cell was photographed using a polyview lens having the structure shown in FIG. 9. Only the photographed portion of the battery cell was cropped from among the image and rotated to direct the lower surface of the battery cell to face upward, and then the side portion and the lower surface portion were distinguished to determine whether the side portion and the lower surface portion were defective. In this case, images of the battery cells determined as being defective are shown in FIG. 14. FIG. 14A shows the image in which a dent phenomenon occurred on the lower surface, FIG. 14B shows the image in which a dent phenomenon occurred on the side surface, FIG. 14C shows the image in which the lower surface was contaminated with the electrolyte, FIG. 14D shows the image in which scratches occurred on the lower surface.

Meanwhile, in the present example, the camera photographing the battery cell was an area scan type camera having five million pixels or more. In addition, in order to inspect eighty battery cells per minute, two image cameras for photographing the battery cells were used when photographing the upper surface of the battery cell and two image cameras were used when photographing the lower surface and the side surface (a total of four cameras).

Comparative Example

The system for inspecting an exterior of a battery cell according to FIG. 1 was used to photograph the exteriors of the upper surface, the side surface, and the lower surface of the battery cell. In addition, in order to inspect eighty battery cells per minute, six image cameras for photographing the battery cells were used when photographing the upper surface of the battery cell, four image cameras were used when photographing the side surface, and four image cameras were used when photographing the lower surface (a total of 14 cameras).

Experimental Example

A size of an area occupied by each piece of equipment used in the system for inspecting an exterior of a battery cell according to the present invention was measured. Specifically, the area including a space occupied by each piece of equipment was indicated by a quadrangular shape and a size of the area was measured.

As a result, the area occupied by the equipment of the system for inspecting an exterior of a battery cell according to the example was measured to have a size of 3300 mm×2000 mm, and the area occupied by the equipment in the comparative example was measured to have a size of 5400 mm×1800 mm.

In conclusion, the system for inspecting an exterior of a battery cell according to the present invention may use a smaller number of cameras compared to the related art and, as fewer pieces of equipment are used, the space occupied by the equipment may be reduced. Consequently, it is possible to reduce costs for an external inspection of the battery cell and improve inspection efficiency.

Although the embodiments have been described with reference to a number of illustrative embodiments thereof, it should be understood that numerous other modifications and embodiments can be devised by those skilled in the art that will fall within the spirit and scope of the essential characteristics of the present invention. Therefore, the drawings disclosed herein are not to be taken in a sense for limiting the technical idea of the present invention but for explanation thereof, and the range of the technical idea is not limited to these drawings. The scope of the present invention should be construed by the appended claims, and all technical ideas within the range of equivalents should be construed as being included in the scope of the present invention.

Meanwhile, in the present specification, terms indicating upward, downward, left, right, front, and rear directions are used, and these terms are merely for convenience of description, and it is obvious that these terms may be varied according to a location of an object or an observer.

DESCRIPTION OF REFERENCE NUMERALS

1 and 100: systems for inspecting an exterior of a battery cell
2: camera
3 and 10: battery cells

110: tray
120: first photographing part
121: first image camera
122: first lighting
123: first controller
130: shuttle
140: transfer part
150: second photographing part
151: second image camera
152: second lighting
153: extractor
154: second controller
155: polyview lens
160: inspection part
161: first inspection part
162: second inspection part
170: alignment jig

The invention claimed is:

1. A system for inspecting battery cell exteriors, comprising:

a tray configured to hold a plurality of battery cells to be inspected in a plurality of rows, wherein the battery cells are arranged in a two dimensional array in the tray;

a first photographing part configured to horizontally move above the tray and photograph an exterior of an upper surface of the battery cells held in the tray;

at least one shuttle configured to hold a row of the battery cells, wherein the row of the battery cells is arranged as a one-dimensional array in the shuttle;

a transfer part that is structurally independent of the shuttle and configured to remove the row of the battery cells from the tray and deposit the battery cells in the shuttle;

a second photographing part configured to photograph exteriors of a side surface and a lower surface of the row of the battery cells held in the shuttle; and an inspection part configured to inspect images photographed by the first and second photographing parts and determine whether the exterior of at least one battery cell of the plurality of battery cells is defective, wherein the second photographing part is configured to photograph the side surface and the lower surface of the battery cell in a single image using a single camera, wherein the single camera includes a main lens facing the lower surface of the battery cells and a plurality of reflectors within a field of view of the main lens, wherein each reflector is positioned to face a respective portion of the side surface of the battery cell such that the single image visualizes each of the lower surface and the respective portions of the side surface of the battery cell.

2. The system of claim 1, wherein the first photographing part includes:

at least one first image camera;

at least one first lighting configured to emit light at different angles using a multi-channel method; and a first controller configured to control operations of the first image camera and the first lighting.

3. The system of claim 2, wherein the first lighting includes coaxial lighting, dome lighting, and low-angle lighting.

4. The system of claim 2, wherein the first controller is configured to:

sequentially photograph the exteriors of the upper surfaces of the battery cells in an initial row of the tray while controlling the first image camera and the first lighting to move along the initial row of the tray;

after the initial row of the tray is photographed, horizontally move the tray to position a next row of the tray below the first photographing part;

sequentially photograph the exteriors of the upper surfaces of the battery cells in the next row of the tray while controlling the first image camera and the first lighting to move along the next row of the tray; and repeat horizontally moving the tray and photographing the exteriors of the upper surfaces of the batteries of the next row of the tray until all rows of the tray are photographed.

5. The system of claim 1, further comprising an alignment jig configured to align central axes of the battery cells disposed in the shuttle and to form regular intervals between the battery cells in the shuttle, wherein the alignment jig is configured to increase a degree of alignment of the battery cells disposed in the shuttle as compared to the degree of alignment of the battery cells in the tray.

6. The system of claim 5, wherein the alignment jig comprises:

a pair of plate-shaped members positioned at opposing side surfaces of the battery cell; and a plurality of grooves positioned at regular intervals on one side of the alignment jig and in contact with the battery cell, and configured to accommodate the battery cells.

7. The system of claim 6, wherein the row of the battery cells held in the shuttle extend along a primary axis, and wherein the plurality of grooves are formed by an undulating pattern in the pair of plates along a direction of the primary axis.

8. The system of claim 1, wherein the second photographing part includes:

one or more second image cameras including the single camera;

one or more second lightings configured to emit light towards the battery cells;

one or more extractors configured to extract the battery cells from the shuttle and transfer the battery cells to a photographing position; and a second controller configured to control operations of the one or more second image cameras, the one or more second lighting, and the one or more extractors.

9. The system of claim 8, wherein the one or more extractors are configured to extract a row of battery cells from the shuttle and move the row of battery cells in a linear path such that each battery cell is sequentially positioned in the photographing position above the single camera.

10. The system of claim 9, wherein the second controller is configured to, for each battery cell of the row of battery cells:

detect the battery cell coming into the photographing position; and in response to the detection, transmit a trigger signal to the single camera to capture the single image of the lower surface and respective portions of the side surface of the battery cell.

11. The system of claim 8, wherein the second photographing part includes:

an extractor configured to extract the row of battery cells having the aligned central axes from the shuttle; and a second controller configured to control operations of the one or more second image cameras, the one or more second lighting, and the one or more extractors.

12. The system of claim 11, wherein the second photographing part includes a camera, and wherein the one or more extractors are configured to extract a row of battery cells from the shuttle and move the extracted row of battery cells in a linear path such that each battery cell is sequentially positioned in the photographing position above the camera.

13. The system of claim 1, wherein the inspection part is configured to:

detect at least one of a color, contrast, or chroma of at least one of the upper surface, the side surface or the lower surface of the at least one battery cell displayed on the images; and determine whether a contamination event, a scratch, or a dent has occurred on the upper surface, the side surface or the lower surface of the at least one battery cell.

14. The system of claim 1, wherein the inspection part is configured to determine whether the exterior of the at least one battery cell of the plurality of battery cells is defective through deep learning.

15. The system of claim 1, wherein the inspection part includes:

a first inspection part configured to inspect images photographed by the first photographing part; and a second inspection part configured to inspect images photographed by the second photographing part.

16. The system of claim 15, wherein the first inspection part is further configured to analyze a two-dimensional code attached to at least one of the upper surfaces, the side surfaces or the lower surfaces of the battery cells.

17. The system of claim 15, wherein the second computing device is configured to:

crop portions of the inspected images to derive cropped images;

distinguish side surface portions from lower surface portions of the battery cells in the cropped images; and determine whether the exterior of at least one battery cell of the plurality of battery cells is defective based at least in part on an inspection of the distinguished side surface portion of the at least one battery cell and the distinguished lower surface portion of the at least one battery cell.

18. The system of claim 1, wherein the plurality of battery cells comprise button-type battery cells or cylindrical battery cells.

19. The system of claim 1, wherein the first photographing part comprises a plurality of first image cameras and a controller, wherein the plurality of first image cameras are positioned over respective rows of the tray and wherein each first image camera is configured to sequentially photograph the exteriors of the upper surfaces of the battery cells in its respective row of the tray while moving along the respective row of the tray.

* * * * *